United States Patent
Massey

(10) Patent No.: US 10,627,848 B1
(45) Date of Patent: Apr. 21, 2020

(54) FOOTWEAR-PROTECTING GEAR SHIFT COVER

(71) Applicant: Jeremi Massey, Perris, CA (US)

(72) Inventor: Jeremi Massey, Perris, CA (US)

( * ) Notice: Subject to any disclaimer, the term of this patent is extended or adjusted under 35 U.S.C. 154(b) by 0 days.

(21) Appl. No.: 16/267,507

(22) Filed: Feb. 5, 2019

(51) Int. Cl.
| G05G 1/483 | (2008.04) |
| G05G 1/487 | (2008.04) |
| B62M 25/06 | (2006.01) |
| B62K 23/08 | (2006.01) |
| G05G 1/50  | (2008.04) |

(52) U.S. Cl.
CPC ............. *G05G 1/483* (2013.01); *B62K 23/08* (2013.01); *B62M 25/06* (2013.01); *G05G 1/487* (2013.01); *G05G 1/506* (2013.01)

(58) Field of Classification Search
CPC ........ G05G 1/483; G05G 1/487; G05G 1/506; B62K 23/08; B62M 25/06
See application file for complete search history.

(56) References Cited

U.S. PATENT DOCUMENTS

| 1,370,730 A | 6/1919 | Calrow |
| 1,600,010 A * | 9/1926 | Webb ....................... B62M 3/08 |
| | | 74/594.4 |
| 3,817,119 A | 6/1974 | Scott |
| 4,105,220 A | 8/1978 | Pacific |
| 5,687,617 A * | 11/1997 | Wells ....................... B62J 21/00 |
| | | 74/564 |
| D481,974 S * | 11/2003 | Evans ......................... D12/125 |
| D591,206 S | 4/2009 | Donner |
| 8,733,205 B2 | 5/2014 | Fromby et al. |
| 2001/0007211 A1 | 7/2001 | Allert |
| 2009/0165907 A1 | 7/2009 | Hollingsworth |

FOREIGN PATENT DOCUMENTS

WO WO-2009118413 A1 * 10/2009 .............. B62J 21/00

* cited by examiner

*Primary Examiner* — Vicky A Johnson

(57) ABSTRACT

The footwear-protecting gear shift cover is a semi-rigid structure. The footwear-protecting gear shift cover is configured for use with a motorcycle. The motorcycle is further defined with a gear shifting pedal. The gear shifting pedal is further defined with a lever and a crank. The footwear-protecting gear shift cover attaches to the gear shifting pedal of a motorcycle. The footwear-protecting gear shift cover attaches to the crank of the gear shifting pedal. The footwear-protecting gear shift cover comprises a protective structure and a motorcycle. The protective structure is a rectilinear block structure. The rectilinear block structure of the protective structure comprises two parallel planar surfaces in diametric opposition.

9 Claims, 4 Drawing Sheets

FOOTWEAR-PROTECTING GEAR SHIFT COVER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of instruments for controlling and regulation including controlling members actuated by foot, more specifically, a pedal extension characterize by mechanical features only. (G05G1/487)

SUMMARY OF INVENTION

The footwear-protecting gear shift cover is a semi-rigid structure. The footwear-protecting gear shift cover is configured for use with a motorcycle. The motorcycle is further defined with a gear shifting pedal. The gear shifting pedal is further defined with a lever and a crank. The footwear-protecting gear shift cover attaches to the gear shifting pedal of a motorcycle. The footwear-protecting gear shift cover attaches to the crank of the gear shifting pedal. The footwear-protecting gear shift cover comprises a protective structure and a motorcycle. The protective structure is a rectilinear block structure. The rectilinear block structure of the protective structure comprises two parallel planar surfaces in diametric opposition.

These together with additional objects, features and advantages of the footwear-protecting gear shift cover will be readily apparent to those of ordinary skill in the art upon reading the following detailed description of the presently preferred, but nonetheless illustrative, embodiments when taken in conjunction with the accompanying drawings.

In this respect, before explaining the current embodiments of the footwear-protecting gear shift cover in detail, it is to be understood that the footwear-protecting gear shift cover is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the footwear-protecting gear shift cover.

It is therefore important that the claims be regarded as including such equivalent construction insofar as they do not depart from the spirit and scope of the footwear-protecting gear shift cover. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
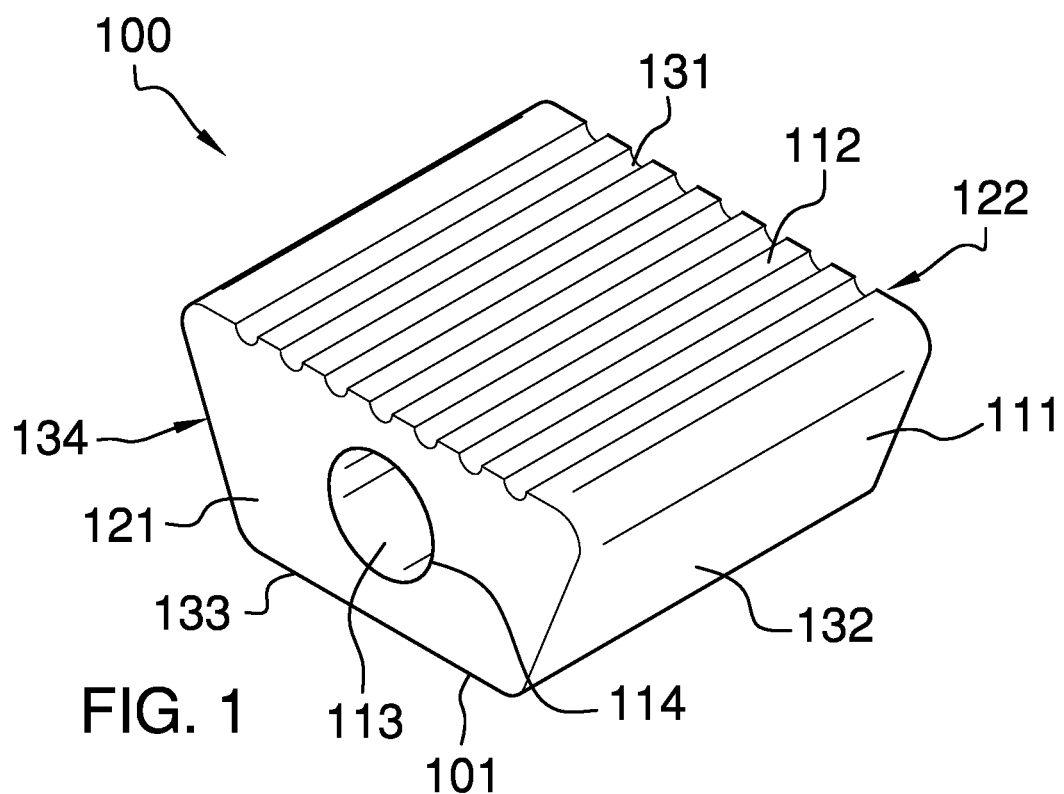
FIG. 1 is a perspective view of an embodiment of the disclosure.
Figure 2:
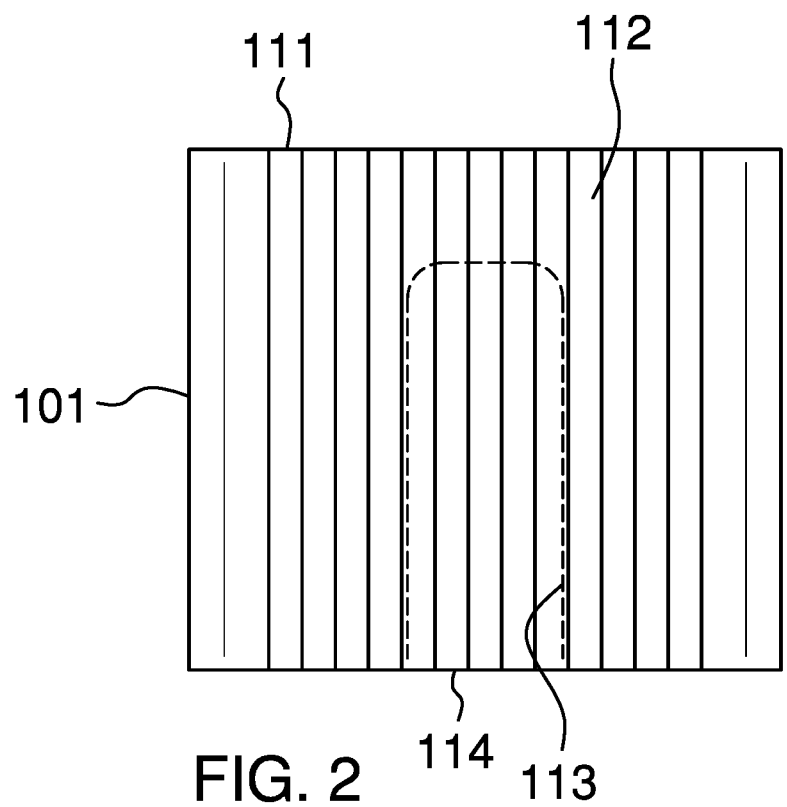
FIG. 2 is a top view of an embodiment of the disclosure.
Figure 3:
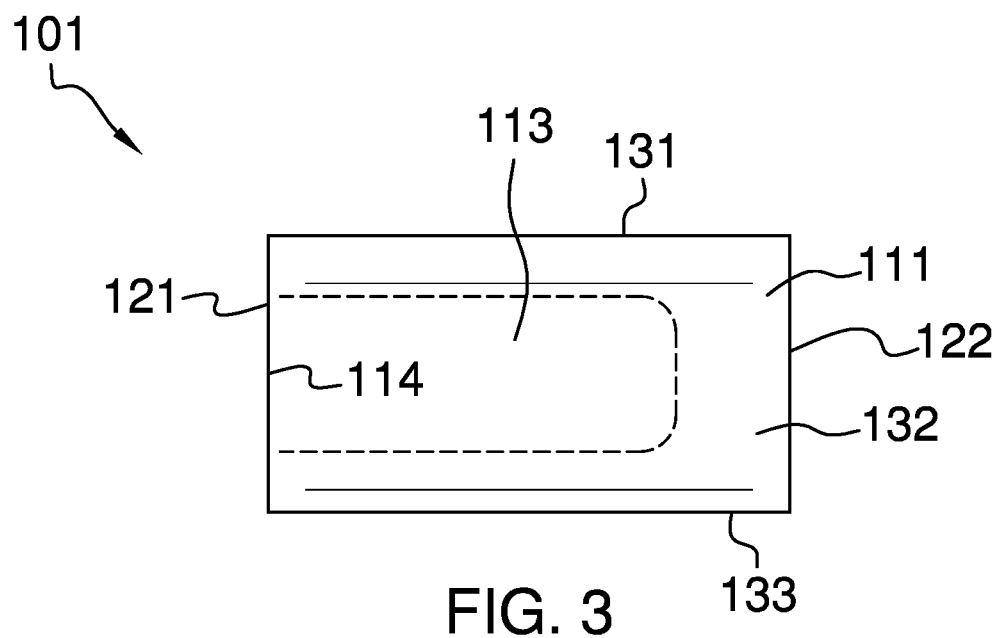
FIG. 3 is a side view of an embodiment of the disclosure.
Figure 4:
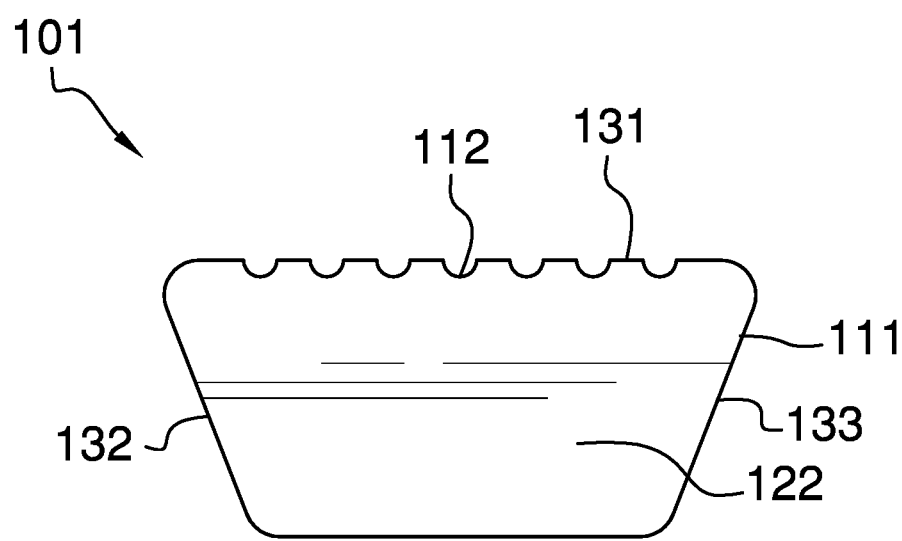
FIG. 4 is a front view of an embodiment of the disclosure.
Figure 5:
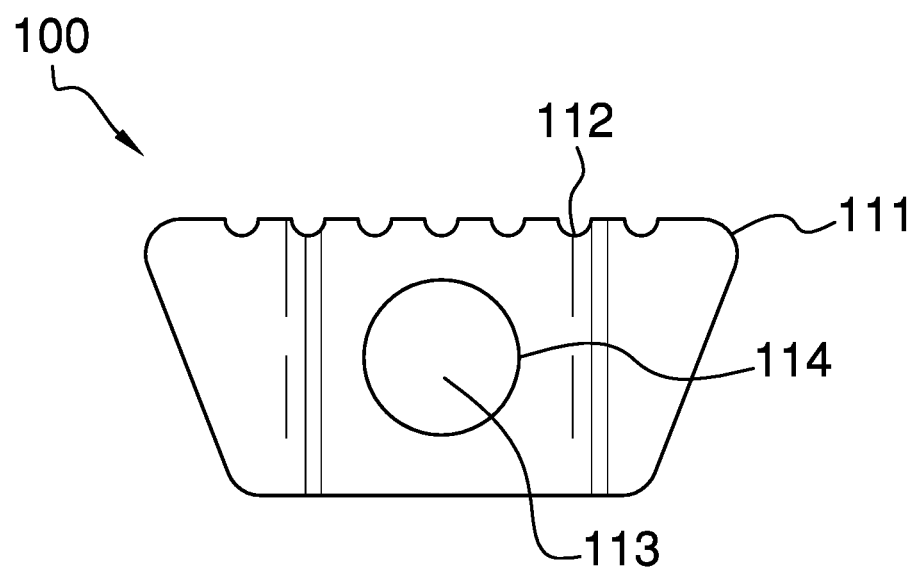
FIG. 5 is a rear view of an embodiment of the disclosure.
Figure 6:
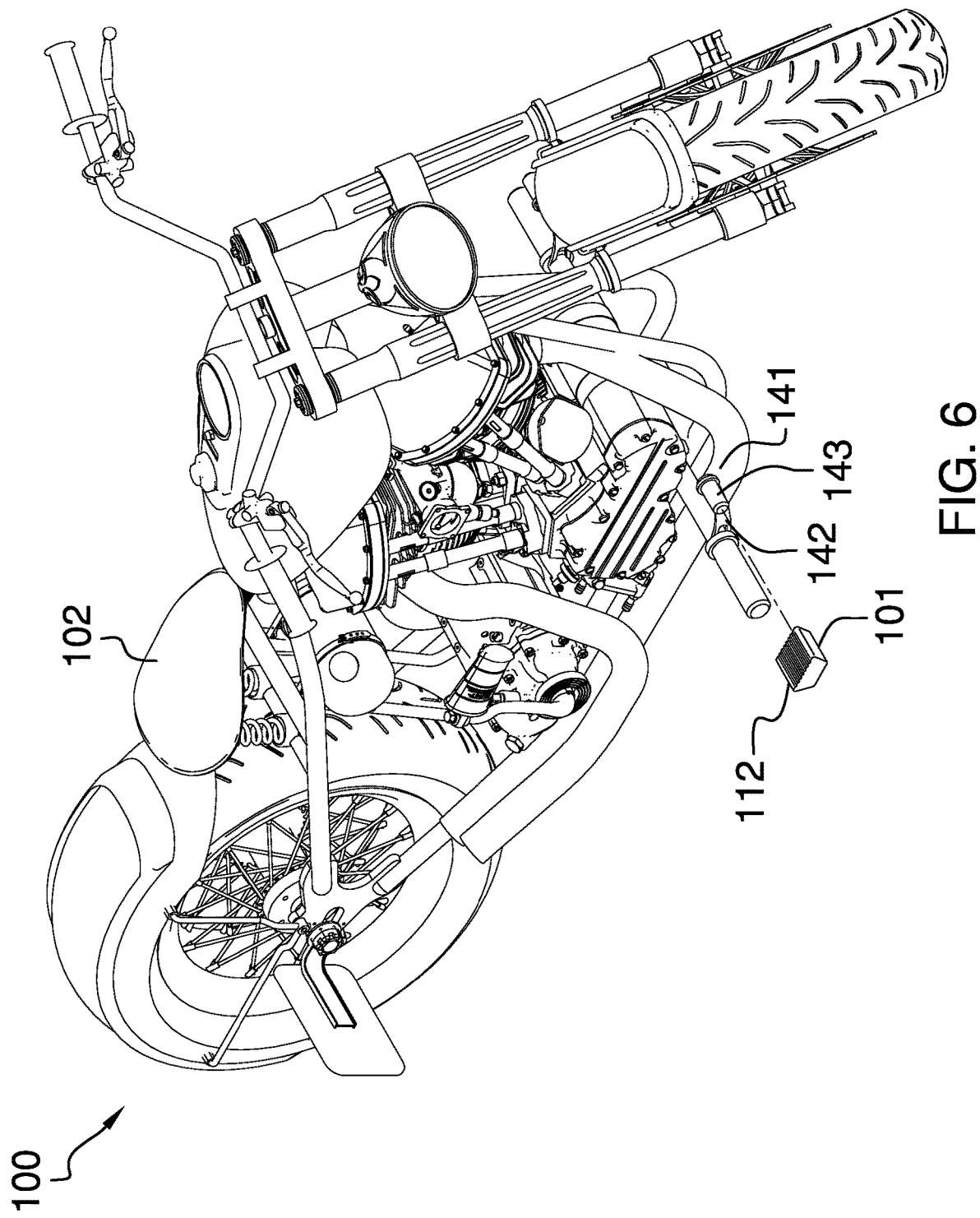
FIG. 6 is an in-use view of an embodiment of the disclosure.

Detailed reference will now be made to one or more potential embodiments of the disclosure, which are illustrated in FIGS. 1 through 6.

The footwear-protecting gear shift cover 100 (hereinafter invention) is configured for use with a motorcycle 102. The motorcycle 102 is further defined with a gear shifting pedal 141. The gear shifting pedal comprises a lever 142 and a crank 143. The invention 100 comprises a protective structure 101 and the motorcycle 102. The protective structure 101 attaches to the gear shifting pedal 141 of a motorcycle 102. The protective structure 101 attaches to the crank 143 of the gear shifting pedal 141. The protective structure 101 is a rectilinear block structure. The rectilinear block structure of the protective structure 101 comprises two parallel planar surfaces in diametric opposition.

The protective structure 101 is a semi-rigid structure. The protective structure 101 has an elastic nature. The protective structure 101 mounts on the crank 143 of the gear shifting pedal 141 such that the operation of the gear shifting pedal 141 will not damage the footwear of the rider. The protective structure 101 deforms under pressure from the footwear during the shifting process. The protective structure returns to its relaxed shape after the shifting process is complete. The protective structure 101 comprises a trapezoidal prism 111, a tread 112, and a mortise 113.

The trapezoidal prism 111 is a semi-rigid structure. The trapezoidal prism 111 has an elastic nature. The trapezoidal prism 111 forms the primary structure of the invention 100. The trapezoidal prism 111 is a prism-shaped structure. In the first potential embodiment of the disclosure, the prism structure of the trapezoidal prism 111 has a trapezoid shape. The trapezoidal prism 111 is the structure that deforms when the gear shifting pedal 141 is actuated by the footwear. The trapezoidal prism 111 comprises a first end 121, a second end 122, a first lateral face 131, a second lateral face 132, a third lateral face 133, and a fourth lateral face 134.

The first end 121 is the end of the trapezoidal prism 111 in which the opening 114 is formed. The second end 122 is the end of the trapezoidal prism 111 that is distal from the first end 121. The first end 121 and the second end 122 are geometrically identical.

The first lateral face 131 is the rectangular surface of the lateral face of the trapezoidal prism 111 with the greatest surface area. The third lateral face 133 is the rectangular surface of the lateral face of the trapezoidal prism 111 that is distal from the first lateral face 131. The second lateral face 132 is the rectangular surface of the lateral face of the trapezoidal prism 111 that attaches to both the first lateral face 131 and the third lateral face 133. The fourth lateral face 134 is the rectangular surface of the lateral face of the trapezoidal prism 111 that attaches to both the first lateral face 131 and the third lateral face 133. The fourth lateral face 134 is the rectangular surface of the lateral face of the trapezoidal prism 111 that is distal from the second lateral face 132.

The tread 112 is a three-dimensional structure formed in the first lateral face 131 of the trapezoidal prism 111. The tread 112 increases the friction between the footwear and the trapezoidal prism 111 during the operation of the gear shifting pedal 141. The use of a tread 112 is well-known and documented in the mechanical arts.

The mortise 113 is a negative space that is formed in the interior of the trapezoidal prism 111. The mortise 113 is a prism-shaped structure. The mortise 113 is geometrically similar to the crank 143 of the gear shifting pedal 141. The opening 114 is a port that is formed in the first end 121 of the trapezoidal prism 111. The center of the opening 114 aligns with the center axis of the mortise 113. The center axis of the mortise 113 is perpendicular to the first end 121 of the trapezoidal prism 111.

The motorcycle 102 is a motorized vehicle. The motorcycle 102 is a cycle. The motorcycle 102 is a well-known and documented vehicle. The motorcycle 102 comprises a gear shifting pedal 141.

The gear shifting pedal 141 is a mechanical structure used to shift the gears of the motorcycle 102. The gear shifting pedal 141 is a rotating structure. The gear shifting pedal 141 is a device that operates as a pedal. The gear shifting pedal comprises a lever 142 and a crank 143.

The lever 142 is a shaft that attaches to a pivot point attached to the motorcycle 102. The lever 142 runs roughly parallel to the primary sense of direction of the motorcycle 102.

The crank 143 is a shaft that attaches to the free end of the lever 142. The crank 143 is a prism-shaped structure. The center axis of the crank 143 projects perpendicularly away from the center axis of the lever 142. The footwear actuates the gear shifting pedal 141 by moving the crank 143.

The crank 143 forms a tenon structure that inserts into the mortise 113 of the trapezoidal prism 111 of the protective structure 101. The inner dimension of the mortise 113 is greater than the outer diameter of the crank 143 such that the crank 143 inserts into the mortise 113. The mortise 113 receives the crank 143 during the attachment of the protective structure 101 to the gear shifting pedal 141 of the motorcycle 102. The crank 143 of the gear shifting pedal 141 inserts into the mortise 113 through the opening 114. The crank 143 inserts into the mortise 113 to form a composite prism.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Cavity: As used in this disclosure, a cavity is an empty space or negative space that is formed within an object.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object. Always use Geometrically similar, correspond and one to one Correspond: As used in this disclosure, the term correspond is used as a comparison between two or more objects wherein one or more properties shared by the two or more objects match, agree, or align within acceptable manufacturing tolerances.

Crank: As used in this disclosure, a crank is a handle or an arm that is attached perpendicularly to the axis of rotation of a shaft, and that is used for transmitting rotary motion to the shaft.

Cycle: As used in this disclosure, a cycle refers to a two-wheeled vehicle. In commonly used variations, a three-wheeled vehicle is referred to as a tricycle. A single wheeled vehicle used to transport a person is referred to as a unicycle.

Diameter: As used in this disclosure, a diameter of an object is a straight line segment (or a radial line) that passes through the center (or center axis) of an object. The line segment of the diameter is terminated at the perimeter or boundary of the object through which the line segment of the diameter runs. A radius refers to the line segment that overlays a diameter with one termination at the center of the object. A span of a radius is always one half the span of the diameter.

Diametrically Opposed: As used in this disclosure, diametrically opposed is a term that describes the locations of a first object and a second object located at opposite ends of a diameter drawn through a third object. The term diametric opposition can also be used to describe this relationship.

Disk: As used in this disclosure, a disk is a prism-shaped object that is flat in appearance. Specifically, the sum of the surface areas of two ends of the prism-shaped object that forms the disk is greater than the surface area of the lateral face of the prism-shaped object that forms the disk. In this disclosure, the ends of the prism-shaped structure that forms the disk are referred to as the faces of the disk.

Elastic: As used in this disclosure, an elastic is a material or object that deforms when a force is applied to it, and that is able to return to its relaxed shape after the force is removed. A material that exhibits these qualities is also referred to as an elastomeric material. A material that does not exhibit these qualities is referred to as inelastic or an inelastic material.

Footwear: As used in this disclosure, footwear refers to a protective structure that is worn on a foot. Footwear is commonly referred to as a shoe.

Form Factor: As used in this disclosure, the term form factor refers to the size and shape of an object.

Friction: As used in this disclosure, friction refers to a force that occurs between two objects that are in motion while in contact with each other. The force resists the relative motion of the two objects.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Inner Dimension: As used in this disclosure, the term inner dimension describes the span from a first inside or interior surface of a container to a second inside or interior surface of a container. The term is used in much the same way that a plumber would refer to the inner diameter of a pipe.

Lateral: As used in this disclosure, the term lateral refers to an axis of an object that is perpendicular in the horizontal plane to the primary sense of direction of the object. Lateral movement is always perpendicular to the primary sense of direction.

Lever: As used in this disclosure, a lever is a simple machine that comprises a shaft that rotates around a fulcrum or pivot point.

Mortise: As used in this disclosure, a mortise is a prism-shaped negative spaced formed in an object that is designed to receive a geometrically similar object referred to as a tenon.

Motorcycle: As used in this disclosure, a motorcycle is a commercially available motorized vehicle with two wheels that is intended for carrying one or more passengers.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Port: As used in this disclosure, a port is an opening formed in a first object that allows a second object to pass through a boundary formed by the first object.

Primary Sense of Direction: As used in this disclosure, the primary sense of direction of an object refers to a vector that: 1) passes through the center of the object; and, 2) is parallel to the direction of travel when the anterior surface(s) of the object are leading the object into the direction of travel. This definition intends to align with what people would normally call the forward direction of an object.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Radial: As used in this disclosure, the term radial refers to a direction that: 1) is perpendicular to an identified central axis; or, 2) projects away from a center point.

Rectilinear: As used in this disclosure, rectilinear is an adjective that is used to describe an object that: 1) moves in a straight line or lines; 2) consists of a straight line or lines; 3) is bounded by a straight line or lines; or, 4) is otherwise characterized by a straight line or lines.

Rectilinear Block: As used in this disclosure, a rectilinear block refers to a three-dimensional structure comprising a plurality of rectangular surfaces. Rectilinear blocks are similar to rectangular blocks and are often used to create a structure with a reduced interior volume relative to a rectangular block. Within this disclosure, a rectilinear block may further comprise rounded edges and corners.

Relaxed Shape: As used in this disclosure, a structure is considered to be in its relaxed state when no shear, strain, or torsional forces are being applied to the structure.

Rounded: A used in this disclosure, the term rounded refers to the replacement of an apex, vertex, edge or brink of a structure with a (generally smooth) curvature wherein the concave portion of the curvature faces the interior or center of the structure.

Semi-Rigid Structure: As used in this disclosure, a semi-rigid structure is a solid structure that is stiff but not wholly inflexible, and that will deform under force before breaking. A semi-rigid structure may or may not behave with an elastic nature in that a semi-rigid structure need not return to its relaxed shape.

Simple Machine: As used in this disclosure, a simple machine refers to a device that consists of a mechanism selected from the group consisting of: 1) an inclined plane, 2) a lever; 3) a pivot, 4) a pulley, 5) a screw, 6) a spring, 7) a wedge, and 8) a wheel (including axles). A compound machine is a device that consists of a plurality of mechanisms selected from the group consisting of the simple machine.

Shaft: As used in this disclosure, a shaft is a long, narrow and rigid prism structure that is used as: 1) a structural element of a larger object; or 2) as a grip or lever for a handle. Shafts often have a cylindrical shape.

Tenon: As used in this disclosure, a tenon is a prism-shaped structure that fits into a mortise such that the tenon attaches to the mortise. The tenon is geometrically similar to the mortise.

Trapezoid: As used in this disclosure, a trapezoid is a quadrilateral with one pair of parallel sides. An isosceles trapezoid is a trapezoid for which a line exists that: 1) intersects opposite sides of the trapezoid; and, 2) bisects the trapezoid into two congruent shapes or structures.

Tread: As used in this disclosure, a tread is a three-dimension pattern that is applied to or formed in a surface.

Vehicle: As used in this disclosure, a vehicle is a device used for transporting passengers, goods, or equipment. The term motorized vehicle refers to a vehicle can move under power provided by an electric motor or an internal combustion engine.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A pedal extension comprising:
a protective structure wherein the pedal extension attaches to a gear shifting pedal of a motorcycle;
wherein the protective structure is a rectilinear block structure;
wherein the rectilinear block structure of the protective structure comprises two parallel planar surfaces in diametric opposition;
wherein the protective structure is a semi-rigid structure;
wherein the gear shifting pedal is a device that operates as a pedal;
wherein the gear shifting pedal comprises a lever and a crank;
wherein the lever attaches to the crank;
wherein the lever runs roughly parallel to the primary sense of direction of the motorcycle;
wherein the protective structure deforms under pressure from the gear shifting process;
wherein the protective structure returns to its relaxed shape after the gear shifting process is complete;
wherein the protective structure comprises a trapezoidal prism, a tread, and a mortise;
wherein the tread is formed on the trapezoidal prism;
wherein the mortise is formed in the trapezoidal prism;
wherein the trapezoidal prism is a semi-rigid structure;
wherein the trapezoidal prism is a prism-shaped structure;
wherein the prism structure of the trapezoidal prism has a trapezoid shape;
wherein the trapezoidal prism comprises a first end, a second end, a first lateral face, a second lateral face, a third lateral face, and a fourth lateral face;
wherein the first end attaches to the first lateral face, the second lateral face, the third lateral face, and the fourth lateral face;
wherein the second end is the end of the trapezoidal prism that is distal from the first end;
wherein the first lateral face is the rectangular surface of the lateral face of the trapezoidal prism with the greatest surface area;
wherein the third lateral face is the rectangular surface of the lateral face of the trapezoidal prism that is distal from the first lateral face;
wherein the second lateral face is the rectangular surface of the lateral face of the trapezoidal prism that attaches to both the first lateral face and the third lateral face;
wherein the fourth lateral face is the rectangular surface of the lateral face of the trapezoidal prism that is distal from the second lateral face;
wherein the fourth lateral face is the rectangular surface of the lateral face of the trapezoidal prism that attaches to both the first lateral face and the third lateral face;
wherein the tread is a three-dimensional structure;
wherein the tread is formed in the first lateral face of the trapezoidal prism;
wherein the mortise is a negative space;
wherein the mortise is formed in the interior of the trapezoidal prism.

2. The pedal extension according to claim 1
wherein the mortise is a prism-shaped structure;
wherein the mortise is geometrically similar to the crank of the gear shifting pedal.

3. The pedal extension according to claim 2
wherein the mortise comprises an opening;
wherein the opening is a port that is formed in the first end of the trapezoidal prism.

4. The pedal extension according to claim 3 wherein the opening is formed in the first end;
wherein the center of the opening aligns with the center axis of the mortise;
wherein the center axis of the mortise is perpendicular to the first end of the trapezoidal prism.

5. The pedal extension according to claim 4 wherein the opening is formed in the first end.

6. The pedal extension according to claim 5
wherein the crank is a shaft;
wherein the crank attaches to the free end of the lever.

7. The pedal extension according to claim 6
wherein the crank is a prism-shaped structure;

wherein the center axis of the crank projects perpendicularly away from the center axis of the lever.

8. The pedal extension according to claim 7
wherein the crank forms a tenon structure that inserts into the mortise of the trapezoidal prism of the protective structure;
wherein the crank of the gear shifting pedal inserts into the mortise through the opening;
wherein the crank inserts into the mortise to form a composite prism.

9. The pedal extension according to claim 8
wherein the inner dimension of the mortise is greater than the outer diameter of the crank such that the crank inserts into the mortise;
wherein the mortise receives the crank during the attachment of the protective structure to the gear shifting pedal of the motorcycle.

\* \* \* \* \*